United States Patent Office 2,872,290
Patented Feb. 3, 1959

2,872,290

STABILIZING SULPHURIC ANHYDRIDE

Louis Blanchard, St. Cloud, France, assignor to Societe Anonyme des Manufactures des Glaces et Produits Chimiques de St. Gobain, Chauny & Cirey, Paris, France No Drawing. Application August 29, 1956
Serial No. 606,798

Claims priority, application France September 5, 1955

4 Claims. (Cl. 23—174)

This invention relates to stable sulphuric anhydride, and to methods for stabilizing it.

Pure sulphuric anhydride is notoriously unstable and its use in industry is correspondingly difficult. Instability shows itself, e. g., by the rapid loss of its liquid state at ordinary temperature. Its melting point is 16.8° C. If traces of moisture are present it rapidly forms different polymers of which the principal ones are the beta, melting at 32° and the alpha, subliming at 45°, which does not melt except under pressure at 62°. It is consequently desirable to stabilize it in its less polymerized forms, which are readily liquifiable and distillable.

The objects of the invention are to stabilize sulphuric anhydride by simple methods, and to produce a novel, stabilized sulphuric anhydride.

The objects of the invention are accomplished generally speaking by reacting phosphorus trihalide with an aldehyde or its polymer, and mixing a small quantity of the resulting product or a small quantity of a fraction of the resulting product, with the sulphuric anhydride. In the preferred form of the invention phosphorus trichloride is reacted with formaldehyde, or a polymer of formaldehyde, of which trioxymethylene is particularly satisfactory.

The preferred reaction produces a product which is a complex of compounds of which certain investigators have identified the following:

(1) $\quad\quad Cl-CH_2-O-CH_2-Cl$
(2) $\quad Cl-CH_2-O-CH_2-O-CH_2-Cl$ (3) 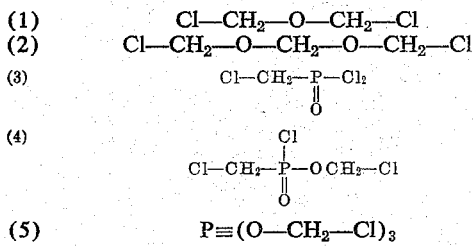

(4)

(5) $\quad\quad P\equiv(O-CH_2-Cl)_3$

The product may be fractionated by distillation at atmospheric or reduced pressure into fractions which are themselves mixtures. In stabilizing sulphuric anhydride one may, according to the invention, use the whole complex without rectification or one may fractionate the complex by distillation and use any fraction; the less volatile fractions are superior in their stabilizing action.

Example

One mole of $PCl_3$ was mixed with three moles of trioxymethylene and a little zinc chloride as a catalyst. An active reaction followed, the course of which was controlled by cooling. The product was a liquid called A, which was distilled at 35 mm. of Hg pressure, yielding a distillate called B which came off below 70° C., and a residue called C. Distillate B was again fractionated at ordinary pressure, yielding a fraction called D between 100 and 102°, a fraction called E between 102 and 105°, and a residue F.

Each of the fractions was mixed at room temperature with freshly prepared sulphuric anhydride in the amount listed in the following table. The anhydride was obtained by a double distillation of oleum of 60% concentration.

The mixtures of anhydride and stabilizer were put in test tubes and subjected to repeated changes in temperature from room temperature (20°) to 0° in 20 hours and reheating to 20° in 4 hours. These 24 hour cycles were repeated as indicated in the table. The alpha form of the anhydride being undesirable, its appearance in any substantial quantity was taken as the endpoint of the test of stability. Thus, the stability was the better as the cycles prior to the appearance of the alpha form were the greater. In the table the symbol > means that the cycles without harmful deterioration of the anhydride were greater than the number shown.

| Test | Fraction | Wt. percent of stabilizer | Cycles | Percent alpha form present at end | Percent beta form | Percent gamma form |
|---|---|---|---|---|---|---|
| 1 | D | 1.1 | 6 | 2 | 0 | 98 |
| 2 | E | 0.934 | >8 | 1 | 0 | 99 |
| 3 | F | 0.95 | >13 | 1 | 0 | 99 |
| 4 | A | 0.986 | >15 | 1 | 0 | 99 |
| 5 | C | 0.214 | >15 | 2 | 0 | 98 |
| 6 | C | 0.485 | >24 | 0.5 | 0 | 99.5 |
| 7 | C | 0.77 | >32 | traces | 0 | 100 |
| 8 | C | 0.98 | >37 | traces | 0 | 100 |
| 9 | C | 2.16 | >20 | traces | 0 | 100 |

In test 9 a much larger amount of stabilizer was used than in the other tests, and at the same time humidity was introduced by adding concentrated sulphuric acid. The fact that no polymerization took place, even in the presence of a small amount of moisture, shows well the stabilizing effect of the invention.

The main advantages are that the stabilizer is effective, is perfectly miscible with the anhydride, is easily added at room temperature, is effective in small quantities, and is effective even in the presence of small quantities of moisture. The crude stabilizer is useful and its higher boiling fractions are especially effective. All quantities are effective in some degree but it is not necessary to add more than .5 to 2.5% in ordinary cases.

As many apparently widely different embodiments of the present invention may be made without departing from the spirit and scope thereof, it is to be understood that the invention is not limited to the specific embodiments.

What is claimed is:

1. Sulphuric anhydride containing a stabilizing amount of at least one of the following compounds:

(1) $\quad\quad Cl-CH_2-O-CH_2-Cl$
(2) $\quad Cl-CH_2-O-CH_2-O-CH_2-Cl$ (3)

(4) 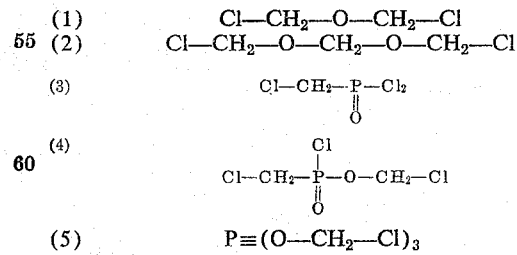

(5) $\quad\quad P\equiv(O-CH_2-Cl)_3$

2. Sulphuric anhydride containing a stabilizing amount of a mixture of compounds from the group:

(1) $\quad\quad Cl-CH_2-O-CH_2-Cl$
(2) $\quad Cl-CH_2-O-CH_2-O-CH_2-Cl$ (3) 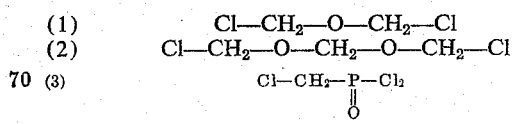

(4) $$\text{Cl-CH}_2-\underset{\underset{O}{\|}}{P}-\text{O-CH}_2-\text{Cl}$$

(5) $$P\equiv(O-CH_2-Cl)_3$$

3. The method of stabilizing sulphuric anhydride that comprises admixing therewith a stabilizing amount of a mixture of the following compounds:

(1) $\text{Cl-CH}_2\text{-O-CH}_2\text{-Cl}$
(2) $\text{Cl-CH}_2\text{-O-CH}_2\text{-O-CH}_2\text{-Cl}$
(3) $$\text{Cl-CH}_2-\underset{\underset{O}{\|}}{P}-\text{Cl}_2$$
(4) $$\text{Cl-CH}_2-\underset{\underset{O}{\|}}{P}-\text{O-CH}_2-\text{Cl}$$
(5) $P\equiv(O-CH_2-Cl)_3$ 4. The method of stabilizing sulphuric anhydride that comprises admixing therewith a stabilizing amount of at least one of the following compounds:

(1) $\text{Cl-CH}_2\text{-O-CH}_2\text{-Cl}$
(2) $\text{Cl-CH}_2\text{-O-CH}_2\text{-O-CH}_2\text{-Cl}$
(3) $$\text{Cl-CH}_2-\underset{\underset{O}{\|}}{P}-\text{Cl}_2$$
(4) $$\text{Cl-CH}_2-\underset{\underset{O}{\|}}{P}-\text{O-CH}_2-\text{Cl}$$
(5) $P\equiv(O-CH_2-Cl)_3$ No references cited.